(12) United States Patent
Winter (10) Patent No.: US 7,574,594 B2
(45) Date of Patent: Aug. 11, 2009

(54) NETWORK AUTHENTICATION BASED ON INTER-PACKET GAP CHARACTERISTICS

(75) Inventor: Robert L. Winter, Georgetown, TX (US)

(73) Assignee: Dell Products LP, Round Rock, TX (US)

( * ) Notice: Subject to any disclaimer, the term of this patent is extended or adjusted under 35 U.S.C. 154(b) by 882 days.

(21) Appl. No.: 11/063,778

(22) Filed: Feb. 23, 2005

(65) Prior Publication Data

US 2006/0191001 A1    Aug. 24, 2006

(51) Int. Cl.
*H04L 9/00* (2006.01)
(52) U.S. Cl. ...................................... 713/151
(58) Field of Classification Search ................. 713/151, 713/161, 168, 170, 152; 709/223, 225, 229
See application file for complete search history.

(56) References Cited

U.S. PATENT DOCUMENTS

| | | | |
|---|---|---|---|
| 6,918,034 B1 * | 7/2005 | Sengodan et al. | 713/160 |
| 7,058,020 B2 * | 6/2006 | Tavana et al. | 370/252 |
| 2003/0161307 A1 * | 8/2003 | Lo | 370/389 |
| 2003/0223383 A1 * | 12/2003 | Chang et al. | 370/310 |
| 2004/0151125 A1 * | 8/2004 | Holmeide et al. | 370/252 |
| 2005/0265349 A1 * | 12/2005 | Garg et al. | 370/395.2 |
| 2008/0022092 A1 * | 1/2008 | Sakaguchi | 713/160 |

* cited by examiner

*Primary Examiner*—Beemnet W Dada
(74) *Attorney, Agent, or Firm*—O'Keefe, Egan, Peterman & Enders LLP (57) ABSTRACT

Network communications in physical layer frame-based networks may be authenticated based on inter-packet gap (IPG) characteristics such as inter-packet gap length, inter-packet gap length pattern, information contained in the inter-packet gap, etc.

8 Claims, 5 Drawing Sheets

NETWORK AUTHENTICATION BASED ON INTER-PACKET GAP CHARACTERISTICS

BACKGROUND OF THE INVENTION

1. Field of the Invention

This invention relates generally to network communications, and more particularly to authentication of network communications.

2. Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems often communicate over networks using frame-based communications. It is important to provide security for such network communications to protect user data and to ensure network reliability. A major component of a complete network security framework is authentication. Authentication can be defined as the validation of a unique user identity and profile. Current authentication methods are implemented in layers 2 or above of the OSI model and are defined in the context of various networking protocols. Unfortunately, security attacks may also target the physical layer, layer 1. Although a physical layer attack may not gain access to an internal network, host compute and network bandwidth can nevertheless be stolen from legitimate users as nodes must process all received packets before any attempt at higher layer authorization may be initiated.

It has been proposed to vary the length of the inter-packet gap (IPG) contained within frames of network communications in order to achieve quality of service (QoS) capability through congestion control, i.e., by increasing the IPG of a given frame stream in order to decrease the effective packet transmittal rate of the frame stream.

SUMMARY OF THE INVENTION

Disclosed herein are methods and systems for authentication of network communications based on inter-packet gap (IPG) characteristics. Examples of such IPG characteristics include, but are not limited to, inter-packet gap length, inter-packet gap length pattern, information contained in the inter-packet gap, etc. The disclosed methods and systems may be advantageously implemented to authenticate network communications in physical layer frame-based networks (networks using network protocols having a physical layer component), making it more difficult for unauthorized network users to consume host resources. Examples of such physical layer network protocols include, but are not limited to, Ethernet (IEEE 802.3), RS232, ATM, Wireless LAN (802.11), Packetized Cellular Radio, FiberChannel, etc. Since detection of IPG characteristics is not typically accessible by a user, implementation of an authentication mechanism that is based on variation of IPG characteristics may be employed to significantly increase the difficulty of un-authorized users accessing host and network resources.

In one exemplary embodiment, an authentication technique may be implemented as a physical layer (OSI layer 1) security mechanism for Ethernet (IEEE 802.3) networks which fully adheres to standards and is relatively simple to implement. The authentication technique of this embodiment utilizes the concept of the IPG (Inter-Packet Gap) as defined by IEEE 802.3 to provide a means to identify authorized physical layer frames, for example, in an Ethernet Local Area Network (LAN). With the identification of frames at the physical layer, detection of unauthorized users may be achieved with minimal host packet processing at an earlier point in time, and increasing the difficulty for unauthorized users to consume host resources. The methodology of the disclosed methods and systems may be similarly implemented with other types of frame-based network communication protocols that employ inter-packet gaps such as Wireless LAN networks which have Inter-Frame Spacing (IFS) characteristics which are similar in nature to IPG (Inter-Packet Gap) for Ethernet.

In one respect, disclosed herein is a method of authenticating network communications, including transmitting or receiving a first frame across a network. The first frame may be transmitted or received with an inter-packet gap associated with the first frame. The inter-packet gap may have one or more inter-packet gap characteristics that may be employed as at least a part of an inter-packet gap authentication criteria for the network.

In another respect, disclosed herein is a method of processing information communicated across a network using a frame-based network protocol, including receiving a frame stream from across a network in a first information handling system configured as a first network node. The frame stream may include one or more frames and inter-packet gaps having an interpacket gap length, and each of the one or more frames may be associated with one of the inter-packet gaps. The method may use physical layer processing to examine the inter-packet gap length associated with each of the one or more frames. The method may include accepting a first frame of the one or more frames if the inter-packet gap length associated with the first frame is greater than or equal to a minimum inter-packet gap length specified for the network protocol, and if the inter-packet gap length associated with the first frame meets an inter-packet gap authentication criteria policy. The method may include rejecting the first frame associated with the one or more frames if the inter-packet gap length associated with the first frame does not meet the inter-packet gap authentication criteria policy.

In another respect, disclosed herein is a network node system, including an information handling system configured to be coupled to a network as network node. The information handling system may be configured to transmit or receive a first frame an inter-packet gap associated with said first frame across a network. The inter-packet gap may have one or more inter-packet gap characteristics that are employed as at least a part of an inter-packet gap authentication criteria for the network.

DESCRIPTION OF ILLUSTRATIVE EMBODIMENTS

Figure 1:
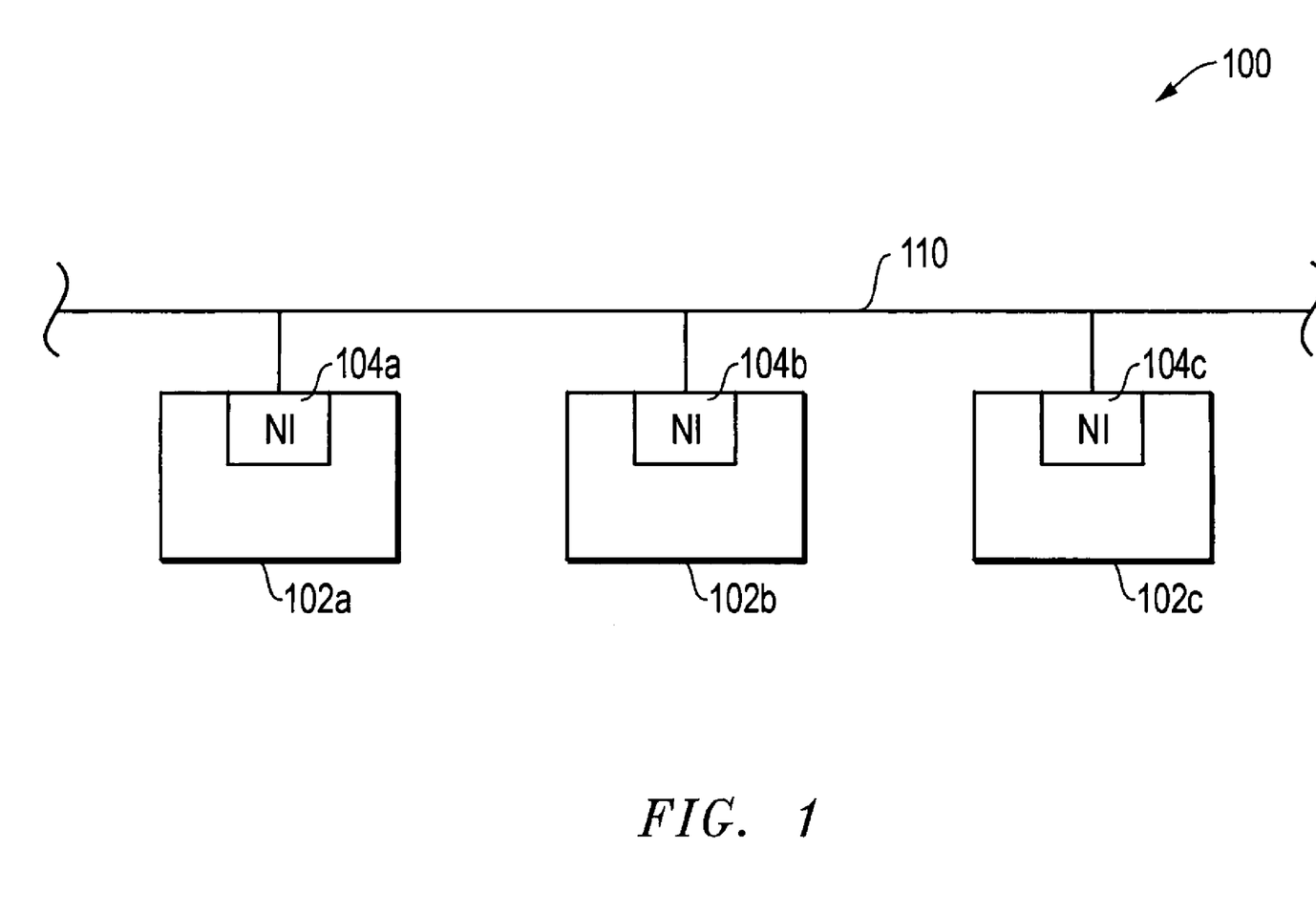
FIG. 1 is a simplified block diagram of a network configuration as it may be employed in the practice of one exemplary embodiment of the disclosed methods and systems.

FIG. 1 illustrates one exemplary embodiment of network 100 that includes network nodes 102 (e.g., information handling systems such as personal computers or other suitable computer system/s) that communicate packet information across network bus 110 (e.g., Ethernet bus). Network 100 may employ any network communication protocol that employs frame-based communication patterns having spacing or gaps between frames. Network 100 may be configured as part of a local area network (LAN), wide area network (WAN), metropolitan area network (MAN), personal area network (PAN), etc. For example Network 100 may be a LAN that is communicatively coupled to an external network, such as the Internet and/or a wide area network ("WAN") via a server, although communication with such an external network is not necessary. As shown, each of network nodes 102 includes a network interface (NI) 104 coupled to network bus 110. Network interface 104 may be a network interface card (NIC) or any other combination of hardware, software and/or firmware that is suitable for handling physical layer processing details of frame reception and/or transmission.

As will be described further herein, the topology of 100 is exemplary only, and it will be understood that the disclosed methods and systems may be implemented in networks having other bus or non-bus topologies (e.g., ring topology), and/or with networks including one or more information handling systems configured as router nodes. Furthermore, it will be understood that the disclosed methods and systems may be implemented with any number of two or more network nodes that are in communication with each other across any wired and/or wireless network communication medium/s suitable for supporting frame-based network communications. Examples of such networks include, but are not limited to, Transport Control Protocol/Internet Protocol ("TCP/IP") based networks over suitable frame-based physical layers. Specific frame-based physical layers include, but are not limited to, IEEE 802.11 series wireless networks, IEEE 802.3 wired networks, cellular wireless networks, etc.

Figure 2:
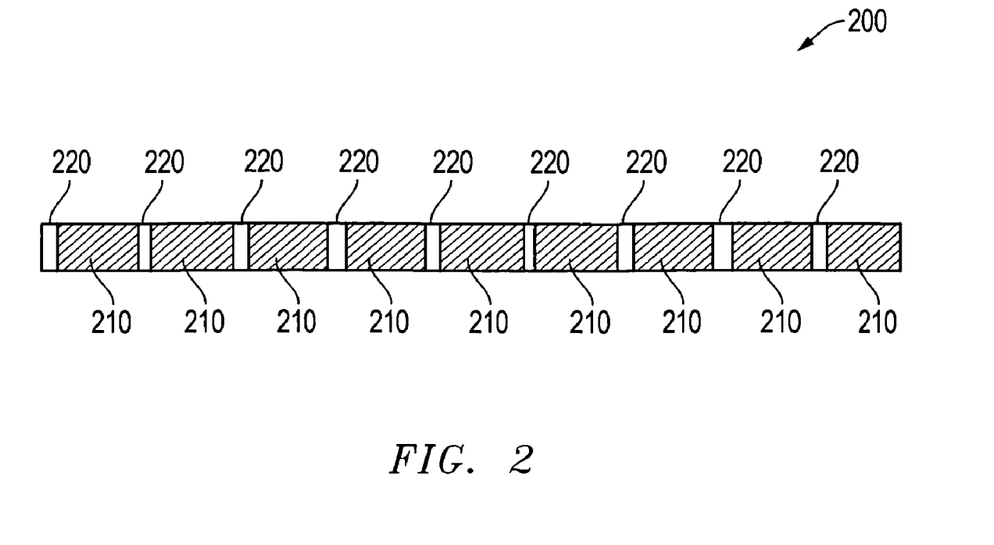
FIG. 2 is simplified representation of a stream of network frames that may be communicated across a network according to one exemplary embodiment of the disclosed methods and systems.

FIG. 2 shows a stream 200 of network frames (e.g., Ethernet frames) 210 that may be communicated across bus 110 between network nodes 102 of FIG. 1 according to one exemplary embodiment of the disclosed methods and systems. As illustrated in FIG. 2, each given frame 210 is preceded by an inter-packet gap (IPG) 220 that is associated with the given frame and that separates it from a preceding frame. As further illustrated, each IPG 220 that is associated with an authorized frame may have a different length, with the minimum inter-packet gap (IPG) requirement for the given network protocol being maintained (e.g., for an IEEE 802.3 network, the IPG of authorized frames may be larger but not smaller than the IEEE 802.3 specified minimum IPG length).

Figure 3:
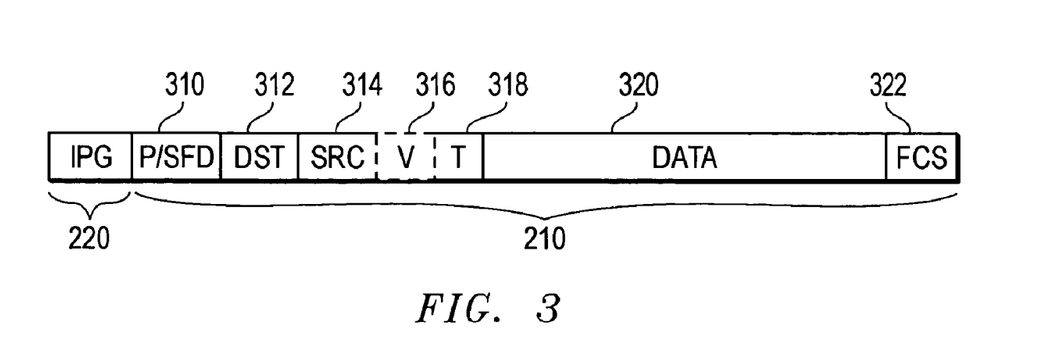
FIG. 3 shows is simplified representation of a single network frame that may be communicated across a network according to one exemplary embodiment of the disclosed methods and systems.

FIG. 3 shows an exemplary format for a single frame 210 of FIG. 2, in this case as it may be configured as an Ethernet frame in one exemplary embodiment of the disclosed methods and systems. As shown in FIG. 3, frame 210 is preceded by inter-packet gap 220, and includes header information followed by payload in the form of data. In particular, frame 210 includes header fields in the form of preamble/source frame delimiter (P/SFD) 310, MAC destination address (DST) 312, MAC source address (SRC) 314, optional virtual local area network (VLAN) tag (V) 316 and type/length information (T) 318. Header information is followed by payload in the form of data 320, and frame check sequence (FCS) 322. It will be understood that the particular illustrated combination of Ethernet fields provided within frame 210 is exemplary only, and that the disclosed methods and systems may be implemented with a frame format configured according to any type of Ethernet or non-Ethernet frame-based communication protocol that employs IPGs to separate frames (e.g., including frame formats having other combinations of types and/or lengths of fields that are present within a given frame). Such frame-based communications may employ frames that include, but are not limited to, any combination of header and payload fields that is suitable for facilitating frame-based communications.

Still referring to the illustrated exemplary frame format embodiment of FIG. 3, P/SFD field 310 may include 7 bytes of 0x55 and 1 byte of 0xD5 (101010...111). DST/SRC fields 312 and 314 may each include 6 bytes. Optional VLAN tag 316 may include 4 optional bytes. Type/length field 318 may include 2 bytes (type encapsulation assumed). Data field 320 may include 46 to 1500 bytes, and FCS field 322 may include 4 bytes. In this exemplary embodiment, the total length of frame 210 may range from 704 to 12,336 bytes (88 to 1542 bits) when optional VLAN tag 316 is present, or may range from 672 to 12,304 bytes (84 to 1538 bits) when optional VLAN tag 316 is not present.

In the practice of the disclosed methods and systems, the length characteristic of a given IPG 220 may be varied as needed to authenticate network communications according to the methodology described elsewhere herein. In this regard, a given IPG 220 may be of any length suitable for accomplishing one or more of the authentication features disclosed elsewhere herein, and as long as it does not interfere with normal operation of the network media. In this regard, where it is necessary to conform to a given frame-based networking communications protocol, the length characteristic of a given IPG 220 may be equal to or larger than a minimum length (or gap) specified for the particular protocol employed. For example, a minimum Ethernet-based packet gap (PG) may be defined in one exemplary embodiment to be 12 byte-times (96 bit times) from the last bit of the FCS to the first bit of the preamble, regardless of interface speed. Thus, for this exemplary embodiment, the minimum IPG would be 9.6 microseconds for a 10 Mbps interface speed (Ethernet). For 100 Mbps interface speed (Fast Ethernet), the minimum IPG would be 0.96 microseconds or 960 nanoseconds. For 1000 Mbps interface speed (Gigabit Ethernet), the minimum IPG would be 0.096 microseconds or 96 nanoseconds. For 10,000 Mbps interface speed (10 Gigabit Ethernet), the minimum IPG would be 0.0096 microseconds or 9.6 nanoseconds. It will be understood that the preceding lengths are exemplary and that other (or no) minimum packet gap lengths may be implemented. However, for protocols requiring such a minimum packet gap length, the packet gap length should be at least as large (greater than or equal to) as the minimum PG length for those frames that are to be processed properly.

As described herein, authentication of network communications may be implemented using specified or pre-set IPG characteristics (e.g., IPG length, pattern of IPG length preceding or otherwise associated with one frame relative to IPG length preceding or otherwise associated with another frame or frames, information included within the IPG, combinations thereof, etc.) as an IPG authentication criteria for acceptance by a network interface node for further host (CPU) processing. In one embodiment, frames meeting this IPG authentication criteria will be accepted by the network interface node for further processing, and frames that do meet this IPG authentication criteria will be dropped. Such an IPG authentication criteria may be implemented for all network interface nodes accessing the network, or for a selected subset of network interface nodes. It is also possible that multiple IPG authentication criteria may be implemented on a single network, e.g., by implementing a first IPG authentication criteria for a first subset of interface nodes, and a second different IPG authentication criteria for a second subset of interface nodes. In this manner, only those frames meeting the first IPG criteria will be accepted by the interface nodes of the first subset, and only those frames meeting the second IPG criteria will be accepted by the interface nodes of the second subset. It will be understood that the disclosed methods and systems may be implemented using more than two IPG authentication criteria, and/or that a given network interface node may be configured to accept frames that meet more than one IPG authentication criteria employed on a given network.

In those embodiments employing IPG length characteristic and/or IPG length pattern characteristics as an IPG authentication criteria, each participating network interface node may be configured to recognize and note IPG lengths preceding or otherwise associated with individual received frames. Such a capability may be implemented in any suitable manner, but in one embodiment may be performed by a network interface (e.g., NIC chip set that is capable of counting byte times between frames) present within each participating network interface node. In one exemplary embodiment wherein IPG length characteristic is used as IPG authentication criteria, the network interface receives each frame and examines the IPG length preceding or otherwise associated with the given frame. Only those frames preceded by or otherwise associated with the proper IPG length will be accepted for host processing. Frames that are not preceded by or otherwise associated with the proper IPG length will not be processed. In this regard, it will be understood that IPG authentication criteria may be based on any length criteria suitable for differentiating frames from each other. For example, IPG authentication criteria may be based on a threshold IPG length (e.g., only those frames preceded by or otherwise associated with an IPG length greater than or equal to a threshold IPG length will be accepted for further processing), an IPG length window (e.g., only those frames having an IPG length that falls between a lower IPG length limit and an upper IPG length limit will be accepted for further processing), a specific IPG length (e.g., only those frames preceded by or otherwise associated with a specific IPG length will be accepted for further processing), etc. In any case, the length of an IPG that is selected for use as an IPG authentication criteria may be chosen such that it only adds a few additional byte time to each frame, and thus does not significantly interfere with throughput.

Figure 4:
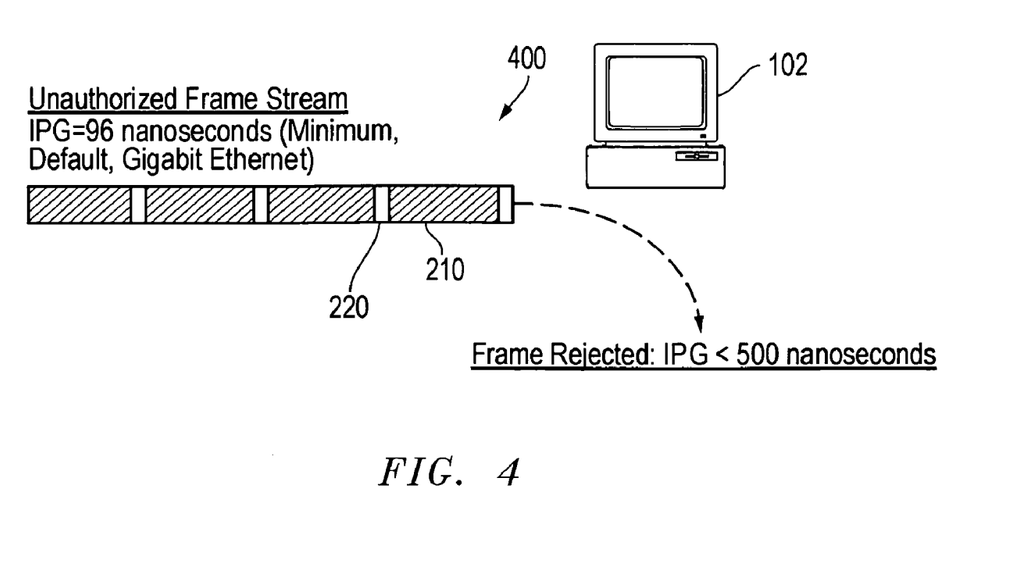
FIG. 4 is simplified representation of a network node receiving an unauthorized frame stream according to one exemplary embodiment of the disclosed methods and systems.
Figure 5:
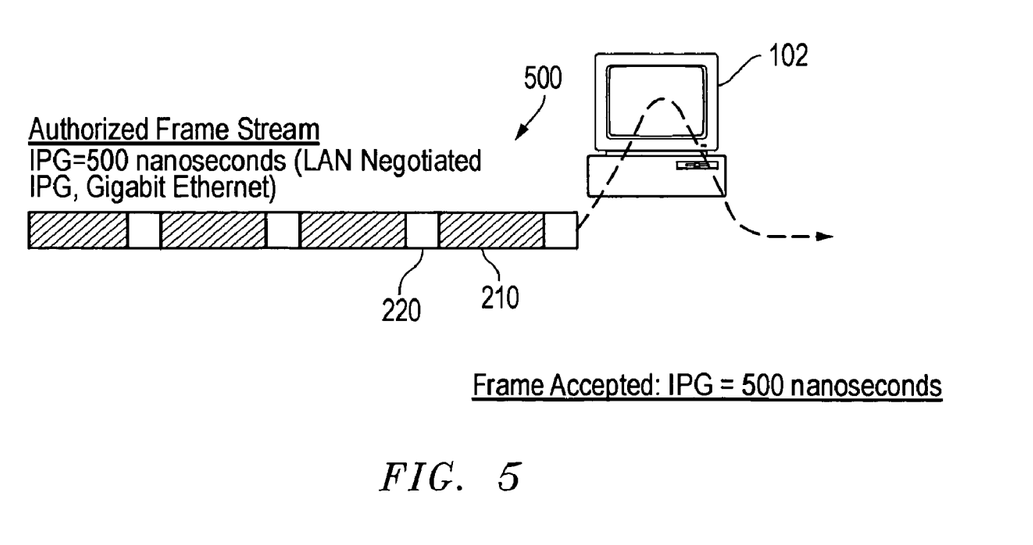
FIG. 5 is simplified representation of a network node receiving an authorized frame stream according to one exemplary embodiment of the disclosed methods and systems.

FIGS. 4 and 5 illustrate one exemplary embodiment for authenticating network communications by accepting and rejecting frames based on length IPG length characteristics. In the exemplary embodiment of FIGS. 4 and 5, a network node 102 is coupled to receive data frames communicated across a Gigabit Ethernet-based LAN. In this exemplary embodiment, a negotiated specific IPG length of 500 nanoseconds has been established as an IPG authentication criteria for acceptance of authorized frames by network node 102 from the network. FIG. 4 shows network node 102 receiving an unauthorized frame stream 400 made up of frames 210 that that are each preceded by an IPG 220 having an IPG length corresponding to the minimum 96 nanosecond IPG length for Gigabit Ethernet. As illustrated in FIG. 4, the physical processing layer of network node 102 examines and compares the IPG length of each IPG 220 of frame stream 400 to the established specific IPG length of 500 nanoseconds and rejects those frames 210 preceded by an IPG length that is not equal to 500 nanoseconds at the physical layer without further processing.

FIG. 5 shows network node 102 receiving an authorized frame stream 500 made up of frames 210 that that are each preceded by an IPG 220 having an IPG length equal to the specific IPG length of 500 nanoseconds. As in FIG. 4, the physical processing layer of network node 102 examines and compares the IPG length of each IPG 220 of frame stream 500 to the established specific IPG length of 500 nanoseconds. As shown, network node 102 accepts those frames 210 preceded by an IPG length that is equal to 500 nanoseconds at the physical layer for further processing by higher layers. Because detection of IPG length is not a value that is typically accessible by a user of network node 102, authentication of network communications based on IPG length characteristics significantly increases the difficulty for un-authorized users to access host and network resources. A similar methodology would apply for authentication of network communications bases on other IPG characteristics or combinations thereof.

Figure 6:
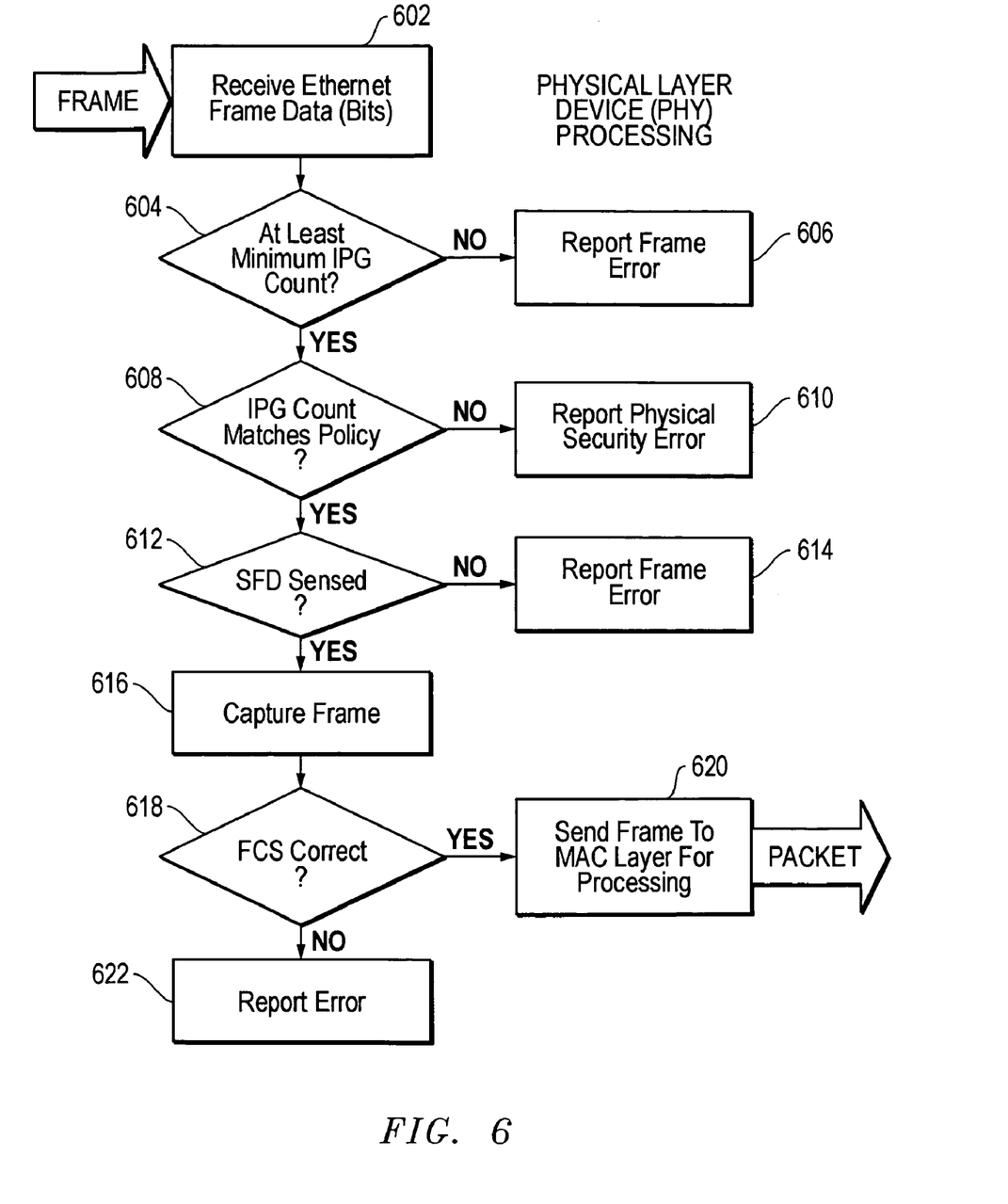
FIG. 6 is a flow diagram showing physical layer device (PHY) processing for Ethernet frames according to one exemplary embodiment of the disclosed methods and systems.

FIG. 6 is a flow diagram showing physical layer device (PHY) processing for Ethernet frames according to one exemplary embodiment of the disclosed methods and systems, e.g., as may be performed by a NIC or other suitable network interface 104 of a network node 102 of FIG. 1. As shown, each Ethernet frame is received in step 602 and the IPG length characteristic preceding each frame is examined in step 604 to ensure that it is greater than or equal to the minimum packet gap length for the protocol in use (e.g., 12 byte-times). If the IPG length (byte count or number of bytes) preceding a given frame is less than the minimum packet gap length for the protocol in use, then the frame is rejected and a frame error may be reported step 606. However, if the IPG length preceding the given frame is greater than or equal to the minimum packet gap length, then the length of the IPG is examined in step 608 to determine if it meets the IPG authentication criteria policy established for the network node 102, e.g., threshold IPG length, IPG length window, specific IPG length, IPG length relative to length of IPG preceding other frame/s (IPG length pattern), etc. If the IPG length (count) of preceding the given frame does not meet the IPG authentication criteria policy, the frame is rejected and a physical security error may be reported in step 610. However, if the IPG length preceding the given frame meets the IPG authentication criteria policy, then the frame is authenticated and processed further in step 612 as described below.

Still referring to FIG. 6, if the SFD of the frame is not sensed in step 612, then the frame is rejected and a frame error may be reported in step 614. However, if the SFD of the frame is sensed in step 612, then the frame is captured in step 616. After capture the FCS is examined in step 618. If the FCS is correct, the frame is accepted in step 620 and sent to the MAC layer of the network node for further processing. If the FCS is not correct, the frame is rejected and an error may be reported in step 622.

It will be understood that the illustrated methodology of FIG. 6 is exemplary only, and that the illustrated steps of FIG. 6 may be performed using any other sequence of physical layer processing steps and/or combination of physical layer processing steps (fewer, additional or alternative steps) that is suitable for performing network communication authentication based on IPG authentication criteria. It will also be understood that other types of IPG characteristics (e.g., IPG length pattern characteristic, IPG content characteristic, combinations thereof, etc.) may be implemented as IPG authentication criteria and evaluated in step 608. Furthermore, the methodology of FIG. 6 may be implemented to process other types of network frames, e.g., non-Ethernet frames of other network communication protocols described elsewhere herein.

Figure 7:
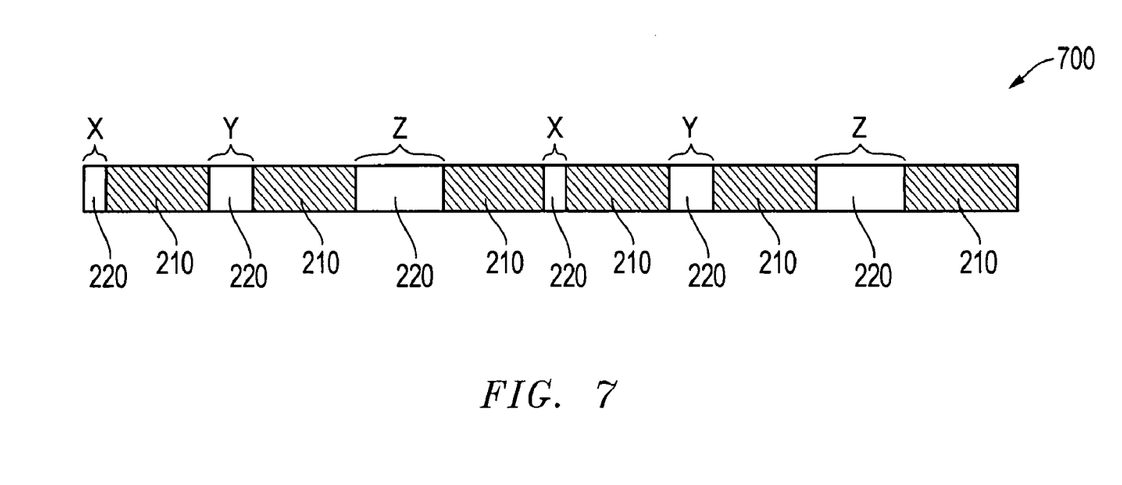
FIG. 7 is simplified representation of a stream of network frames that may be communicated across a network according to one exemplary embodiment of the disclosed methods and systems.

FIG. 7 illustrates another exemplary embodiment of the disclosed methods and systems in which IPG length pattern characteristics may be employed as IPG authentication criteria for authenticating network communications. As shown in FIG. 7, a frame stream 700 stream is made up of frames 210 that are each preceded by an IPG 220 having a length X, Y or Z. In this embodiment, the values of X, Y and Z may be selected relative to each other so as to define a pattern that may be used by physical layer processing layer of a network node (e.g., network interface 104 of network node 102 of FIG. 1) to determine if a given frame meets the IPG authentication criteria policy, such as in step 608 of FIG. 6. In this regard, the IPG length values of X, Y and Z may be assigned relative to each other based on an equation (e.g., each value assigned based on a polynomial equation, etc.) and/or using any other suitable relationship (e.g., each value assigned arbitrarily or according to a given code). To illustrate, a relationship between X, Y and Z may be defined by a simple function, f(X,Y,Z), where Z=2*Y, Y=2*X, and X=minimal IPG for the given network protocol in use, although this is merely an example for illustration purposes and any other relationship suitable for implementing the disclosed methods and systems may be employed.

Although illustrated in FIG. 7 as having different IPG lengths, it will be understood that IPG lengths preceding or otherwise associated with two or more different frames may have IPG lengths relative to each other that define any pattern suitable for use as an IPG authentication criteria policy, e.g., IPG lengths of two or more different frames of the same IPG authentication pattern may have the same IPG length.

Still referring to FIG. 7, only frames preceded by IPG length values meeting the defined IPG authentication criteria policy are accepted for further processing. For example, in one exemplary embodiment an IPG authentication cycle may be initiated each time a first frame 210 preceded by an IPG length of X is received and detected by a network node. In this example, the next two frames received in the IPG authentication cycle must be preceded by respective IPG lengths corresponding to Y and Z (the next values in the IPG pattern of the IPG authentication criteria) in order to be accepted for further processing. These frames are rejected if they are preceded by IPGs having IPG length characteristics that do not so correspond to the selected IPG authentication pattern.

It will be understood that the embodiment of FIG. 7 is exemplary only, and that an IPG length pattern may be defined to include any two or more IPG length values that form a pattern suitable for use as an IPG authentication criteria. Furthermore, although an IPG authentication criteria policy utilizing a single repeating IPG authentication pattern (i.e., X, Y, Z, X, Y, Z, etc.) is illustrated in FIG. 7, it is also possible that an IPG authentication criteria may be implemented using two or more non-repeating IPG authentication patterns (e.g., X, Y, Z, A, B, C, D, E, F, etc.), using two or more alternating IPG authentication patterns (e.g.,. X, Y, Z, A, B, C, X, Y, Z, A, B, C, etc.), etc., where X, Y, Z, represent IPG lengths of a first pattern; A, B, C represent IPG lengths of a second pattern; D, E, F represent IPG lengths of a third pattern.

In another exemplary embodiment of the disclosed methods and system, IPG content characteristics may be used as an IPG authentication criteria. In this regard, an IPG preceding or otherwise associated with a given frame may include content in the form of information that may be recognized at the physical processing layer of a network node (e.g., decoded by network interface 104 of network node 102 of FIG. 1 in a step such as step 608 of FIG. 6) to determine if a given frame is to be rejected or accepted for further processing. Such IPG content information may be of any format and/or amount that is suitable for distinguishing a given frame from other frames at the physical processing layer for purposes of authentication. It will be understood that an IPG authentication criteria policy may be implemented to accept a given frame based on the presence of information contained in the IPG associated with the given frame, based on the absence of information contained in the IPG associated with the given frame, based on a pattern formed by information contained in the IPG associated with the given frame relative to information contained in the IPG associated with other frames, combinations thereof, etc.

Figure 8:
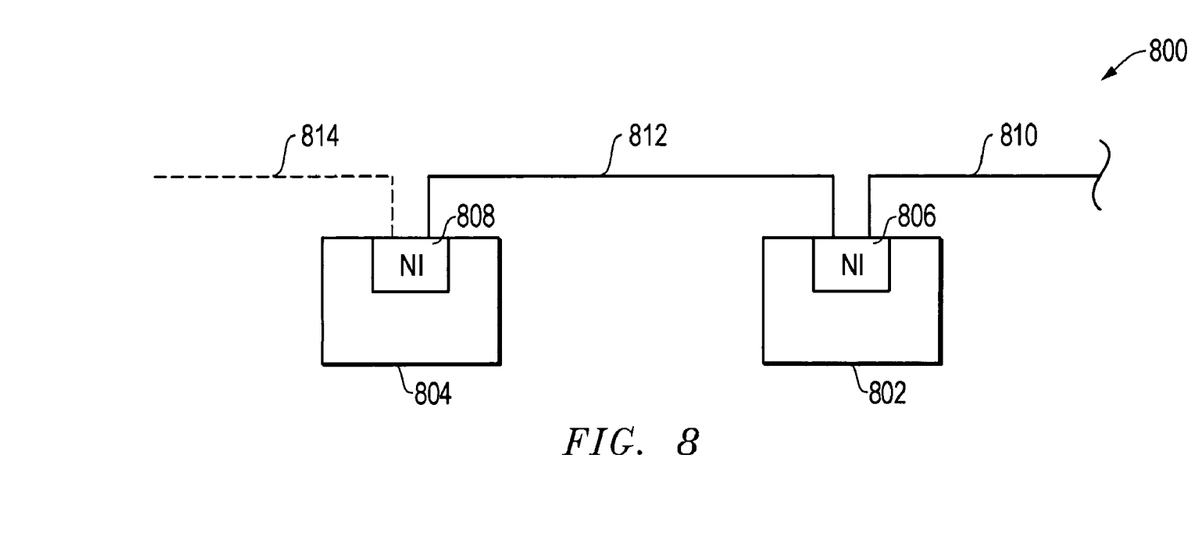
FIG. 8 is a simplified block diagram of a network configuration as it may be employed in the practice of one exemplary embodiment of the disclosed methods and systems.

FIG. 8 illustrates a network 800 that includes network nodes 802 and 804 (e.g., information handling systems such as personal computers or other suitable computer system/s) that communicate frame information across network connections 810 and 812. Network 800 may be configured as part of a local area network (LAN), wide area network (WAN), metropolitan area network (MAN), personal area network (PAN), etc., and may or may not be coupled to communicate with the Internet. As shown, network node 802 includes a network interface (NI) 806 coupled to receive and/or transmit network communications across either of network connections 810 or 812, and network node 804 includes a network interface (NI) 808 coupled to receive and/or transmit network communications across network connection 812. In this regard, each of network interfaces 806 and 808 may be a network interface card (NIC) or any other combination of hardware, software and/or firmware that is suitable for handling physical layer processing details of frame reception and/or transmission.

In the exemplary configuration of FIG. 8, frames destined for network node 804 from network connection 810 must first be processed at the physical layer by network interface 806 of network node 802, and frames destined for network connection 810 from network node 804 must first be processed network node 802 includes a network interface (NI) 806 coupled to receive and/or transmit network communications across either of network connections 810 or 812. In this regard, network node 802 may represent, for example, a router, access point and/or firewall device that acts to couple network node 804 to a larger and/or external network, or network nodes 802 and 804 may form a portion of a ring topology network with other network nodes not shown. In the latter case, optional network connection 814 may be present to couple network node 804 to another network node in the ring.

Still referring to FIG. 8, the disclosed methods and systems may be advantageously implemented to authenticate network communications from network connection 810 to network node 804 (and other nodes optionally coupled to network node 804 via optional network connection 814) in a manner that eliminates unauthorized frames or frame streams from being forwarded past network node 802 to network node 804 and beyond. Such an embodiment may be advantageously employed, for example, to reduce or eliminate unauthorized network traffic (e.g., such as traffic generated by denial of service attacks destined for one or more network nodes of network 800) from network connection 812, network node 808 and optionally beyond. In this regard, network interface 806 of network node 802 may receive frames from network connection 810 that are destined for network node 804 (and optional nodes beyond). Network interface 806 may reject unauthorized frames received from network connection 810 using an IPG authentication criteria policy (such as disclosed elsewhere herein), and not pass these frames on to network connection 812. At the same time, network interface 806 may accept authorized frames received from network connection 810 using the same IPG authentication criteria policy, and pass these frames on to network connection 812. A similar methodology may be implemented for those frames received by network interface 806 from network connection 812 and destined for network connection 814. Either way, an IPG authentication policy may be implemented only by network interface 806, or may also be implemented by network interfaces of one or more other network nodes of network 800.

It will be understood that the disclosed methods and systems may be implemented using any hardware, firmware, software and/or combination thereof configured to produce frames for transmission preceded by or otherwise associated with IPGs having IPG characteristics as needed or desired to fit the IPG authentication criteria selected for a given application. In this regard, it is possible that a network interface (e.g., NIC chip set that is capable of varying IPG length) of a given network node may be configured with such capability in addition to, or as an alternative to, being configured with the capability of recognizing such IPG characteristics associated with frames received by the given network node.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a PDA, a consumer electronic device, a network storage device, or any other suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various input and output (I/O) devices, such as a keyboard, a mouse, and a video display. The information handling system may also include one or more buses operable to transmit communications between the various hardware components.

While the invention may be adaptable to various modifications and alternative forms, specific embodiments have been shown by way of example and described herein. However, it should be understood that the invention is not intended to be limited to the particular forms disclosed. Rather, the invention is to cover all modifications, equivalents, and alternatives falling within the spirit and scope of the invention as defined by the appended claims. Moreover, the different aspects of the disclosed methods and systems may be utilized in various combinations and/or independently. Thus the invention is not limited to only those combinations shown herein, but rather may include other combinations.

What is claimed is:

1. A method of processing information communicated across a network using a frame-based network protocol, comprising:
   receiving a frame stream from across a network in a first information handling system configured as a first network node, said frame stream comprising one or more frames and inter-packet gaps having an inter-packet gap length, and each of said one or more frames being associated with one of said inter-packet gaps;
   using physical layer processing to examine said inter-packet gap length associated with each of said one or more frames;
   accepting a first frame of said one or more frames if said inter-packet gap length associated with said first frame is greater than or equal to a minimum inter-packet gap length specified for said network protocol, and if said inter-packet gap length associated with said first frame meets an inter-packet gap authentication criteria policy; and
   rejecting said first frame associated with said one or more frames if said inter-packet gap length associated with said first frame does not meet said inter-packet gap authentication criteria policy;
   wherein said first frame is preceded by said inter-packet gap.

2. The method of claim 1, wherein said inter-packet gap authentication criteria policy comprises a length threshold, specific length or a length window.

3. The method of claim 1, wherein said inter-packet gap authentication criteria policy comprises a length of said inter-packet gap of said first frame relative to a length of an inter-packet gap of a second frame received at said network node.

4. The method of claim 1, and wherein said step of accepting further comprises sending said first frame to a MAC processing layer of said first network node for further processing.

5. The method of claim 1, wherein said method further comprises communicating said first frame from said first network node across said network to an information handling system configured as a second network node if said first frame is accepted by said first network node; and not communicating said first frame from said first network node across said network to said second network node if said first frame is rejected by said first network node.

6. A network node system, comprising:

an information handling system configured to be coupled to a network as network node, said information handling system comprising a network interface that includes one or more processors, said processors of said network interface being configured for coupling to transmit or receive a first frame and inter-packet gap associated with said first frame across a network;

wherein said inter-packet gap has one or more inter-packet gap characteristics; and wherein said one or more inter-packet gap characteristics are employed by said one or more processors of said network interface as at least a part of an inter-packet gap authentication criteria for said network;

wherein said first frame is preceded by said inter-packet gap; and wherein said information handling system is further configured to:

receive a frame stream from across said network, said frame stream comprising one or more frames including said first frame, and each of said one or more frames being preceded by an inter-packet gap having an inter-packet gap length, use physical layer processing to examine said inter-packet gap length preceding each of said one or more frames, accept said first frame of said one or more frames for further processing if said inter-packet gap length preceding said first frame is greater than or equal to a minimum inter-packet gap length specified for said network protocol, and if said inter-packet gap length preceding said first frame meets an inter-packet gap authentication criteria policy, and reject said first frame of said one or more frames if said inter-packet gap length preceding said first frame does not meet said inter-packet gap authentication criteria policy.

7. The system of claim 6, wherein said inter-packet gap authentication criteria policy comprises a length threshold, specific length or a length window.

8. The system of claim 6, wherein said inter-packet gap authentication criteria policy comprises a length of said inter-packet gap preceding said first frame relative to a length of an inter-packet gap preceding a second frame received at said network node.

* * * * *

UNITED STATES PATENT AND TRADEMARK OFFICE
CERTIFICATE OF CORRECTION

| | | |
|---|---|---|
| PATENT NO. | : 7,574,594 B2 | Page 1 of 1 |
| APPLICATION NO. | : 11/063778 | |
| DATED | : August 11, 2009 | |
| INVENTOR(S) | : Robert L. Winter | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1202 days.

Signed and Sealed this

Seventh Day of September, 2010

David J. Kappos
*Director of the United States Patent and Trademark Office*